United States Patent
Vogel et al.

(10) Patent No.: US 6,645,443 B1
(45) Date of Patent: Nov. 11, 2003

(54) DEVICE FOR REFORMING EDUCTS CONTAINING HYDROCARBONS

(75) Inventors: Bernhard Vogel, Freiburg (DE); Alexander Schuler, Freiburg (DE); Konstantin Ledjeff-Hey, deceased, late of Müllheim (DE), by Sylvie Hey, legal representative

(73) Assignee: Fraunhofer-Gesellschaft zur Forderung der angewandten Forschung e.V., Munich (DE)

(*) Notice: Subject to any disclaimer, the term of this patent is extended or adjusted under 35 U.S.C. 154(b) by 0 days.

(21) Appl. No.: 09/424,441

(22) PCT Filed: Mar. 23, 1998

(86) PCT No.: PCT/EP98/01686
§ 371 (c)(1),
(2), (4) Date: Apr. 12, 2000

(87) PCT Pub. No.: WO98/52868
PCT Pub. Date: Nov. 26, 1998

(30) Foreign Application Priority Data

May 23, 1997 (DE) .......................................... 197 21 630

(51) Int. Cl.[7] ................................................. F28D 7/00
(52) U.S. Cl. .................... 422/200; 422/188; 422/190; 422/191; 422/192; 422/193; 422/196; 422/197; 422/198; 422/201; 422/202; 422/204; 422/211; 422/222
(58) Field of Search .................. 422/188, 190, 422/191, 192, 193, 196, 197, 198, 200, 201, 202, 204, 211, 222; 48/127.9, 198.7; 165/145, 164, 165, 167; 252/373; 423/650, 651, 652

(56) References Cited

U.S. PATENT DOCUMENTS

| | | | |
|---|---|---|---|
| 3,912,443 A | * 10/1975 | Revault et al. | 431/328 |
| 4,313,491 A | * 2/1982 | Molitor | 165/83 |
| 4,548,789 A | * 10/1985 | Ballestra | 422/160 |
| 4,959,079 A | * 9/1990 | Grotz et al. | 48/198.7 |
| 5,164,163 A | 11/1992 | Aoki et al. | |
| 5,229,102 A | 7/1993 | Minet et al. | |

FOREIGN PATENT DOCUMENTS

| | | | | |
|---|---|---|---|---|
| DE | 1 542 624 | | 3/1970 | |
| DE | 3940700 A | | 6/1990 | |
| DE | 19721630 | | 2/1999 | |
| EP | 0314408 A | | 5/1989 | |
| EP | 0 360 505 | | 3/1990 | |
| FR | 2374946 A | | 7/1978 | |
| GB | 2226775 A | * | 7/1990 | B01J/8/06 |
| JP | 60-235634 | | 11/1985 | |
| JP | 4-021501 | | 1/1992 | |

* cited by examiner

Primary Examiner—Jerry D. Johnson
Assistant Examiner—Basia Ridley
(74) Attorney, Agent, or Firm—Leydig, Voit & Mayer, Ltd.

(57) ABSTRACT

The invention relates to a device for reforming educts containing hydrocarbons, having a radiation burner and a reforming reactor, which contains, at least in part, metal honeycomb bodies having a catalyst coating, and which can in particular be used to produce hydrogen from fossil energy carriers. The invention should thereby be able to convert educts containing hydrocarbons into synthesis gases with high efficiency, in particular in a low-power range. For this purpose, a radiation burner is used that heats a two-part reforming reactor by radiation and convection. The radiation burner and the two parts of the reforming reactor are thereby arranged and constructed in such a way that the radiation burner surrounds the two parts of the reforming reactor, and the educt gas and smoke gas can be conducted in counter-current between the two parts of the reforming reactor.

10 Claims, 7 Drawing Sheets

DEVICE FOR REFORMING EDUCTS CONTAINING HYDROCARBONS

The invention relates to a device for reforming educts containing hydrocarbons. The inventive device can be used in particular for industrial, and also smaller, installations for producing hydrogen from fossil energy carriers such as natural gas, liquid gas or naphtha, and thereby operates according to what is known as the "steam reforming method." The hydrogen-rich synthesis gases obtained in this way are subsequently used for example for the manufacture of ammoniac or alcohol or for the synthesis of methanol, an essential application being the production of high-purity hydrogen, which can also be used in a wide range of fuel cells.

The invention is particularly suited for producing hydrogen from fossil energy carriers in the low-power range, such as for example for membrane fuel cell systems for decentralized stationary production of current, where compact units and structural sizes are particularly important. In such cases of application, a high degree of efficiency must be attained, and in particular the heat losses, which increase proportionally in smaller installations, must be taken into account. The heat emission of the burner unit, taking into account the heat sink formed by the reforming reactor, must here be specifically taken into account and kept efficient.

For this purpose, besides the known large industrial hydrogen production installations, in the course of continuing fuel cell research special reforming systems have been developed that are based on what is called the heat exchanger principle. Using such installations, hydrogen can be produced in a quantity that reaches several hundred kW, in relation to the net calorific value of the hydrogen. The hydrogen produced in this way can then be used in high-temperature fuel cells, such as for example SOFC or MCFC, and also in phosphoric acid fuel cells for decentralized power supply.

In this context, in smaller systems having polymer membrane fuel cells it is known to use methanol as an energy carrier; the steam reforming of methanol already takes place here at temperatures of 200 to 300° C., since the reforming reaction of methanol has a lower reaction enthalpy than that of methane, which can likewise be used. This relatively low temperature range enables a lower installation-related outlay, and heat losses can be caught much more easily than is the case given starting materials (educts) such as for example natural gas. In the reforming of methanol, for example an additional fluid can be used as a heat transfer medium, and the energy losses can be reduced by the use of corresponding insulation.

In the known installations, the reforming reaction takes place with the use of solid catalysts, such as for example $Ni/Al_2O_3$. The standardly used flame burners are generally positioned centrically in the reforming unit, or such a burner is flange-mounted on the reforming unit. The smoke gases that arise during combustion are then led past the reactor walls in gaps, so that the heat required for the reaction can be transferred in convective fashion. In order to achieve good conversions in the reforming, sufficiently large transfer surfaces must be present.

A pre-heating of the educt or educts can be achieved by counter-current flow or same-direction flow of educt gas and process gas, in order to enable partial exploitation of the high enthalpy current of the process gas and reduction of the heating capacity.

However, it is not possible to use simple reduction in size to adapt the known installations to small low-power systems. In particular, problems arise here in the heat transfer, and in smaller installations relatively high heat losses can be compensated, if at all, only at a relatively high expense.

It is thus the object of the invention to propose a device with which educts containing hydrocarbons can be converted into synthesis gases in the low-power range with high efficiency.

According to the invention, this object is achieved by means of the features of patent claim 1. Advantageous specific embodiments and developments of the invention result with the use of the features named in the subordinate claims.

The inventive device can be used for steam reforming of various educts containing hydrocarbons, but can also be used unproblematically in other strongly endothermic processes.

The advantages of the invention are in particular that small power ranges, less than 50 kW, can be covered without a reduction in efficiency due to excessive heat losses.

The inventive device is thereby distinguished in that a radiant burner being used is arranged in connection with a two-part reforming reactor in such a way that the parts of the reforming reactor can be heated by radiation and convection, and the radiation burner thereby surrounds the two parts of the reforming reactor in annular, that is, tubular, fashion, whereby the radiation burner can also be formed from planar elements that form a polygon. The arrangement of the individual elements of the inventive device thereby takes place in such a way that educt gas and smoke gas can be conducted in counter-current flow between the two parts of the reforming reactor.

Preferably, one part of the reforming reactor is fashioned as an annular-gap reactor, and the other part is fashioned as a tube reactor, and the two are arranged in relation to one another in such a way that the annular-gap reactor surrounds the tube reactor in tubular fashion, and smoke gas can be conducted in the intermediate space between the two parts, so that the heat of the smoke gas can be exploited optimally for the reforming.

In a further development of the inventive device, it is particularly advantageous that this device is further fashioned so as to have a heat exchanger that is arranged above the reforming reactor that is made up of the two parts. In this heat exchanger, the heat of the smoke gas can then also be used to pre-heat the educt introduced into the reactor, or also to pre-heat several educts, or to vaporize a liquid educt.

In particular given low powers that are to be produced using an inventive device, this thermal coupling has the result that the heat losses can be minimized.

Coated metal honeycomb bodies, with the aid of which the reforming reaction is carried out catalytically, are housed in the reaction spaces of the tube reactor and the annular-gap reactor. Platinum and nickel, but also copper and zinc, are suitable for use as catalysts with which the metal honeycomb bodies can be coated.

The annular-gap reactor is heated predominantly by the heat radiation of the radiation burner, whereas the tube reactor is heated by convection through the smoke gases conducted past it.

The conducting of the produced synthesis gas advantageously takes place in counter-current to the smoke gas coming from the radiation burner; that is, the first unit is the convectively heated tube reactor, the second unit is the annular-gap reactor, heated via radiation and convection, and the exit of the synthesis gas then takes place via the heat exchanger, which is arranged above the two parts of the reforming reactor.

The radiation burner used in the inventive device can preferably be constructed from ceramic apertured plates, arranged in such a way that, as already stated above, they surround the reforming reactors, and the supplying of the combustion gas to the radiation burner takes place via an annular space that is formed around the individual plates of the radiation burner with a housing wall, and in which the combustion gas can be supplied in pre-mixed form. Moreover, a gas distributor tube, having an aperture structure distributed over the entire height of the radiation burner, can be used for the supplying of the combustion gas, in order to achieve a uniform supplying of combustion gas.

The heat exchanger, which is preferably placed directly on the two parts of the reforming reactor, is essentially made up of a coiled tube through which the educts used for the reforming can flow into the tube reactor. The coiled tube is thereby multiply wound in the shape of a cross, so that before introduction into the tube reactor the educt can be given a sufficiently long dwell time and a correspondingly high degree of heating.

In the heat exchanger, tubes can be present that are preferably fashioned concentrically and that form a labyrinth structure through which the smoke gas is conducted, and the residual heat thereof can thereby be used for the heating or vaporization of the educt or educts. Smoke gas and educt are thereby conducted in counter-flow. The radiation burner used in the inventive device can on the one hand be influenced by influencing the ratio of combustion gas to air, or to pure oxygen, or to air enriched with oxygen. Another possibility is to vary the surfaces of the tube of the radiation burner that are used for the combustion, in that particular segments, i.e., individual plates, are supplied with combustion gas or are not so supplied. However, the combustion can also be influenced in such a way that only partial areas of segments or plates of the radiation burner are supplied with combustion gas, or at least two radiation burners, which can be operated individually or together, are arranged one over the other. Equivalently, it is possible to use a two-stage or multi-stage radiation burner.

This has the result that partial-load operation is unproblematically possible while maintaining the specific radiation powers of the operated parts of the radiation burner. In particular, this has an advantageous effect if the inventive device is used in connection with fuel cells that have a very good partial load characteristic, so that the flexibility of the device can be exploited for this case of application in particular.

In addition, with the inventive device it is unproblematically possible, while taking into account the various capacities required, to match the ratio of the free cross-sections for the two parts of the reforming reactor and/or the height of these two parts of the reforming reactor to one another. The gas velocity in the honeycomb channels, and accordingly also the heat and material transport inside the two parts of the reforming reactor, can be influenced in this way. This enables a local influencing of the reaction conversion and of the temperatures in the two parts of the reforming reactor.

Another possibility, which will be discussed further below, is to arrange insulators in the parts of the reforming reactors, in order to thermally decouple particular regions or particular built-in structures, and thus to support the bringing in of heat and to influence it locally. The pre-mixed combustion gas, which is conducted in pre-mixed form to the wall—preferably fashioned as apertured plates—of the radiation heater, is ignited at the inner surface of the apertured plates, and no flame balls arise directly over the respective apertures. In this way, the surface is strongly heated, and can be heated to the point of glowing. The surface of the radiation burner then acts as a radiating surface opposite the heat sink formed by the reforming reactor. Since the plates are made of ceramic, the temperatures during combustion can be controlled easily, and there is the further advantage that the back side radiates only slight heat loss, and an arcing back into the surrounding gas gap can be avoided. By influencing the ratio of combustion gas to air or to oxygen, it is possible to influence the temperatures in the gas gap and on the burner surface, as already mentioned. In this way, it is possible to influence the ratio of the radiation heat emission to the emission via convection.

However, the radiation burner can also be operated in segmented fashion, since the radiation burner is preferably constructed from individual plates. The radiation burner can be constructed and operated in such a way that each individual plate, or selected groups of several plates, can be supplied with combustion gas and heated correspondingly, so that in the latter case the same conditions (power density, surface temperatures) can be maintained optimally even in the partial load range, i.e., the heating of individual plates. One such possibility consists in the heating of only the upper regions of the plates, which act as a burner surface. However, individual plates can also be disconnected, and thus not heated; here an alternating change between heated and unheated plates should in particular be exploited.

If only the upper region of the burner surface is heated, i.e., the part positioned in the direction toward the heat exchanger arranged above the reforming reactors, the greatest heat radiation is in this region, and this can advantageously be exploited for the process.

Taking into account the heating of the annular-gap reactor, the radiation burner can be operated in such a way that temperatures around approximately 1000° C. can be reached on the burner surface, and in this way the formation of nitrogen oxide can be greatly reduced even in the leaner-than-stoichiometric range. However, the temperatures that are achieved are thereby sufficiently high to transfer radiated heat to the annular-gap reactor at temperatures of approximately 800° C.

The arrangement or operation of the radiation burner directly opposite the end zone of the reforming reactor has an advantageous effect, since there it is possible to provide for maximum conversion in the reforming, due to the very high temperatures.

The energy content from the combustion that remains after the coupling out of the radiation power in the smoke gas is then transferred convectively to the two parts of the reforming reactor, whereby the heat transfer first enters the lower region of the annular-gap reactor from the outside, and subsequently enters via the gas gap between the annular-gap reactor and the tube reactor.

Through the honeycombs, coated with catalyst, of the metallic honeycomb bodies in the two parts of the reforming reactor, the inner heat transport from the wall to the reaction zones of the honeycomb channels takes place via convective transfer to the gas, and via heat radiation to the nearest channel wall. In this way a significantly better radiation heat transfer is achieved in comparison with the packed-bed reactors used in the prior art. The metal honeycombs used enable very small radial temperature gradients, and lead to a higher conversion at the same wall temperature.

The carrying off of the reforming gas (synthesis gas) takes place in counter-current to the heating smoke gas from the radiation burner, so that unnecessarily high temperature differences are avoided, and the respective walls of the parts of the reforming reactor are subject to less heat loading. During the transition from the tube reactor into the annular-gap reactor through tube supports having a small through-flow surface, there takes place a thorough mixing (swirling) of the individual gas currents from the radially distributed honeycomb channels. This thorough mixing ensures a uniform temperature and a homogeneous synthesis gas mixture already upon entry into the annular-gap reactor.

The heat exchanger, fashioned in the way already described, ensures that the smoke gases are supplied to the reforming in cross-counter-current to the educt or educts. The temperatures thereby decrease from the inside outward, and the heat losses can be kept low. In this way, the waste heat from the smoke gas and from the reforming can be used optimally for the heating of the educt or educts. Moreover, after the reforming the sensitive heat of the synthesis gas is partly exploited by radiation in the heat transmitter.

With the inventive device, the heat transfer can take place optimally using the combination of a radiation burner low in harmful substances with a reforming reactor, or, if necessary, given an endothermic reaction the heat transfer can take place optimally using the combination of radiation and convection.

By means of the two-part construction of the reforming reactor and a suitable local arrangement of the radiation burner, the ratio of the heat radiation to the convectively transferred heat can be adjusted in a highly variable fashion. This has the additional result that at the exit of the reforming reactor, where the highest temperatures are required anyway, both forms of heat transfer are present at the same time.

The two-part construction of the reforming reactor makes it possible to adjust inner parameters of the material transport and the heat transport (dwell time, gas velocity).

Through the arrangement of the radiation burner in relation to the reforming reactor, and the concrete realization thereof, the heat transfer from the radiation burner takes place from the outside inwards to the reaction zones, and heat losses can be avoided, whereby a pre-heating of the combustion gases is possible at the same time.

In comparison with the known solid-material catalysts, the use of honeycomb bodies that are coated with the catalyst has the advantage that a lower mass is required, and more favorable dynamic characteristics can be achieved in the reforming. With the use of platinum as a catalyst, no reduction is required, since it is already present in active form after the coating, and oxidizing conditions can cause no change. In this way mixed processes are also possible, such as an autothermic reforming.

The individual elements, such as the radiation burner, the two-part reforming reactor, and the correspondingly arranged and fashioned heat exchanger, enable high efficiency due to very high heat-related coupling, despite small absolute power ratings.

In the following, the invention is explained in more detail on the basis of exemplary embodiments.

Figure 1:
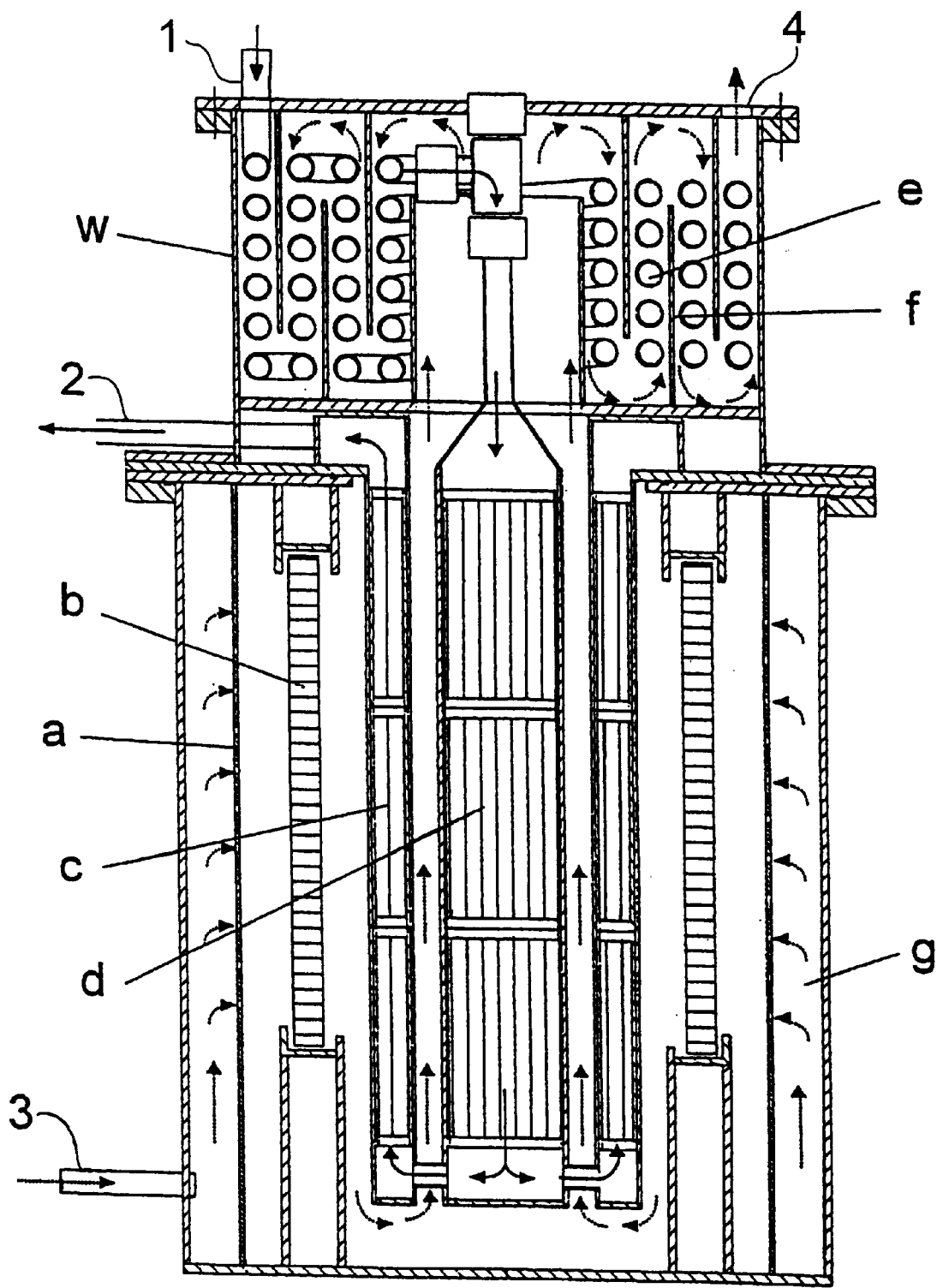
FIG. 1 shows an exemplary embodiment of an inventive device in a sectional representation.

FIG. 1 shows a possible design as an example of an inventive device in a sectional representation. The educt or educts thereby flow via a supply line 1 into a heat exchanger w, and are there conducted via coiled tubes e, around which there flows smoke gas that is drawn out of the heat exchanger through the smoke gas exit 4. In the heat exchanger w, concentric tubes f form a labyrinth structure, so that during the presence of smoke gas and educts a relatively good heat transfer, and corresponding exploitation of the residual heat of the smoke gas, can take place.

The pre-heated educts, vaporized if necessary, then flow out of the coiled tube e into the tube reactor d, which is a part of the reforming reactor, and are there conducted by catalyst-coated metal honeycombs. After flowing through the tube reactor d, the educts, which are already at least partially reformed, flow into the second part of the reforming reactor, namely into an annular-gap reactor c, in which the almost complete reforming of the educts takes place, and thus a sufficiently pure synthesis gas can be drawn off via the exit 2.

The two parts c and d of the reforming reactor are surrounded by a radiation burner b. The radiation burner b can for example be made up of individual plate-shaped segments attached to one another, which segments are in turn preferably formed from a ceramic material and are fashioned as apertured plates.

Via at least one combustion gas supply line 3, the combustion gas flows via a gas distributor tube g to the apertured plates of the radiation burner b, whereby in the gas distributor tube g, on the side a facing the apertured plates of the radiation burner b, a uniform aperture structure is fashioned that ensures that a uniform supply of combustion gas takes place to the radiation burner b, and a nearly uniform temperature distribution can be achieved along the combustion surfaces of the radiation burner b.

The smoke gas that arises in the combustion is conducted into the heat exchanger w via the gap that is formed between the annular-gap reactor c and the tube reactor d, and in this way ensures that a multiple exploitation of the residual heat of the smoke gases can take place.

The heating of the two-part reforming reactor thereby takes place on the one hand via radiation and on the other hand via radiation and convection. Thus, the annular-gap reactor c is heated by radiation and convection, and the tube reactor d is heated exclusively by convection, in order to achieve, in these two parts of the reforming reactor, the reforming of the educts to form synthesis gas.

Figure 2:
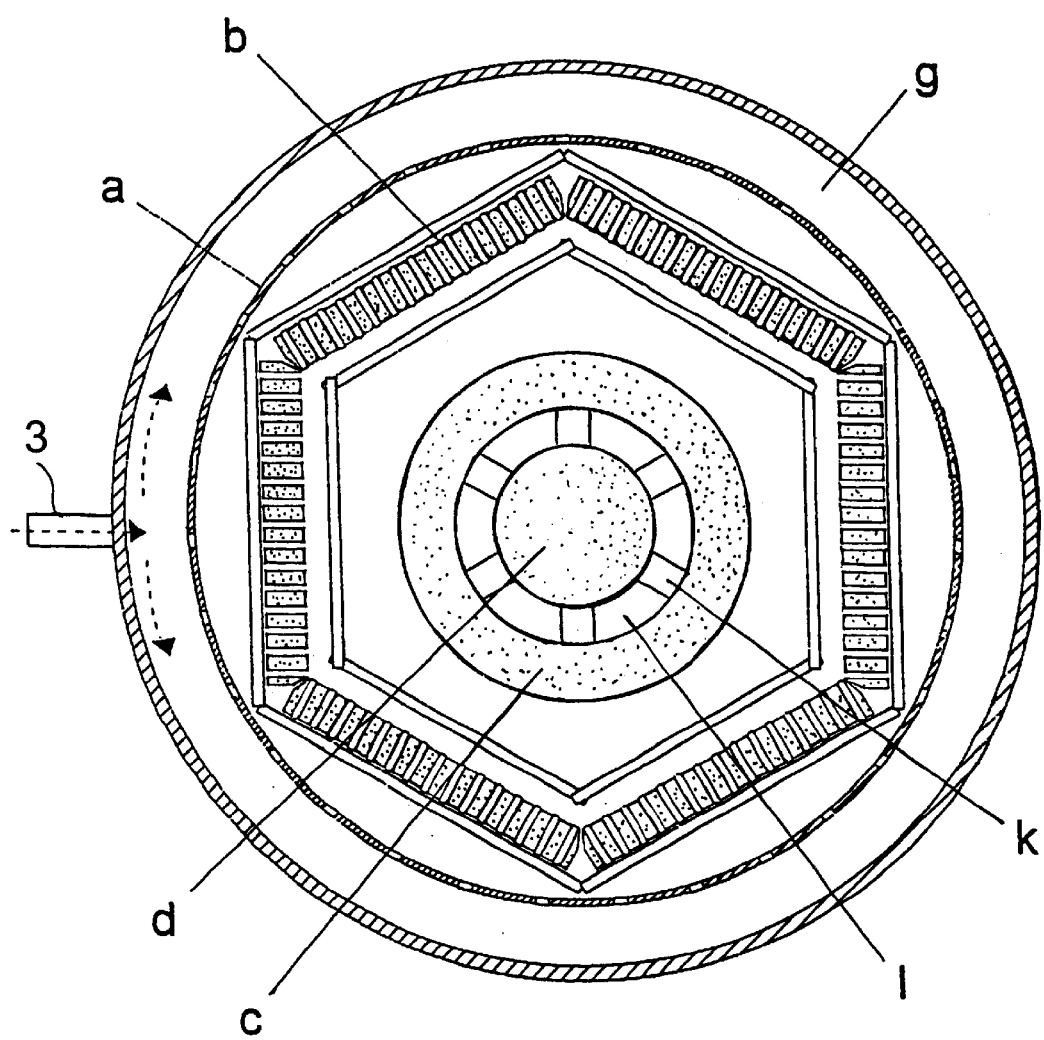
FIG. 2 shows the schematic design in a sectional representation as a top view.

In FIG. 2, the design of the exemplary embodiment according to FIG. 1 can be seen in a sectioned top view. Here the combustion gas is again conducted via the combustion gas supply line 3 into the gas distributor tube g, through the hole structure formed on the inner wall a thereof, to the radiation burner b, which is constructed in segmented form from individual plates. In this example, the individual plates form a hexagon, but a different polygonal shape having more or fewer individual plates can also be selected. However, a closed structure that surrounds the reforming reactor on all sides along its longitudinal direction must thereby be formed, so that the jacket surfaces of the reforming reactor are shielded on all sides.

The two parts of the reforming reactor c and d are then arranged in the interior of the radiation burner b. The annular-gap reactor c and the tube reactor d are held at a distance from one another by means of tube supports k, and a space 1 is formed between these two parts of the reforming reactor, through which the smoke gas can flow into the heat exchanger w.

Figure 3:
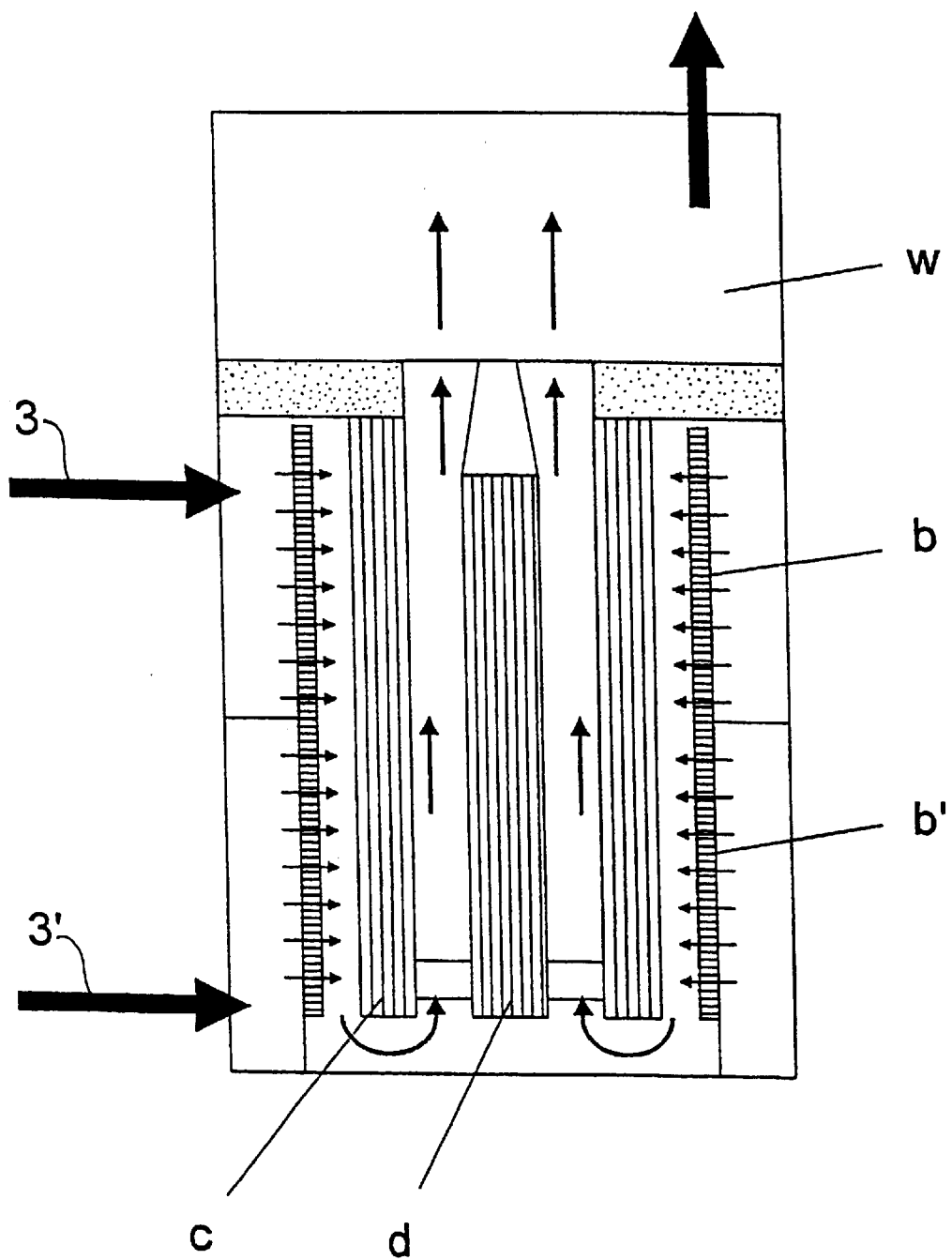
FIG. 3 shows the schematic design of a device according to FIG. 1.

FIG. 3 shows an example of an inventive device having a two-part radiation burner b, b' operating in full-load operation. Via two separate combustion gas supply lines 3 and 3', combustion gas flows to the two radiation burners b and b' and both are heated, so that the annular-gap reactor c and the tube reactor d can be heated maximally.

Figure 4:
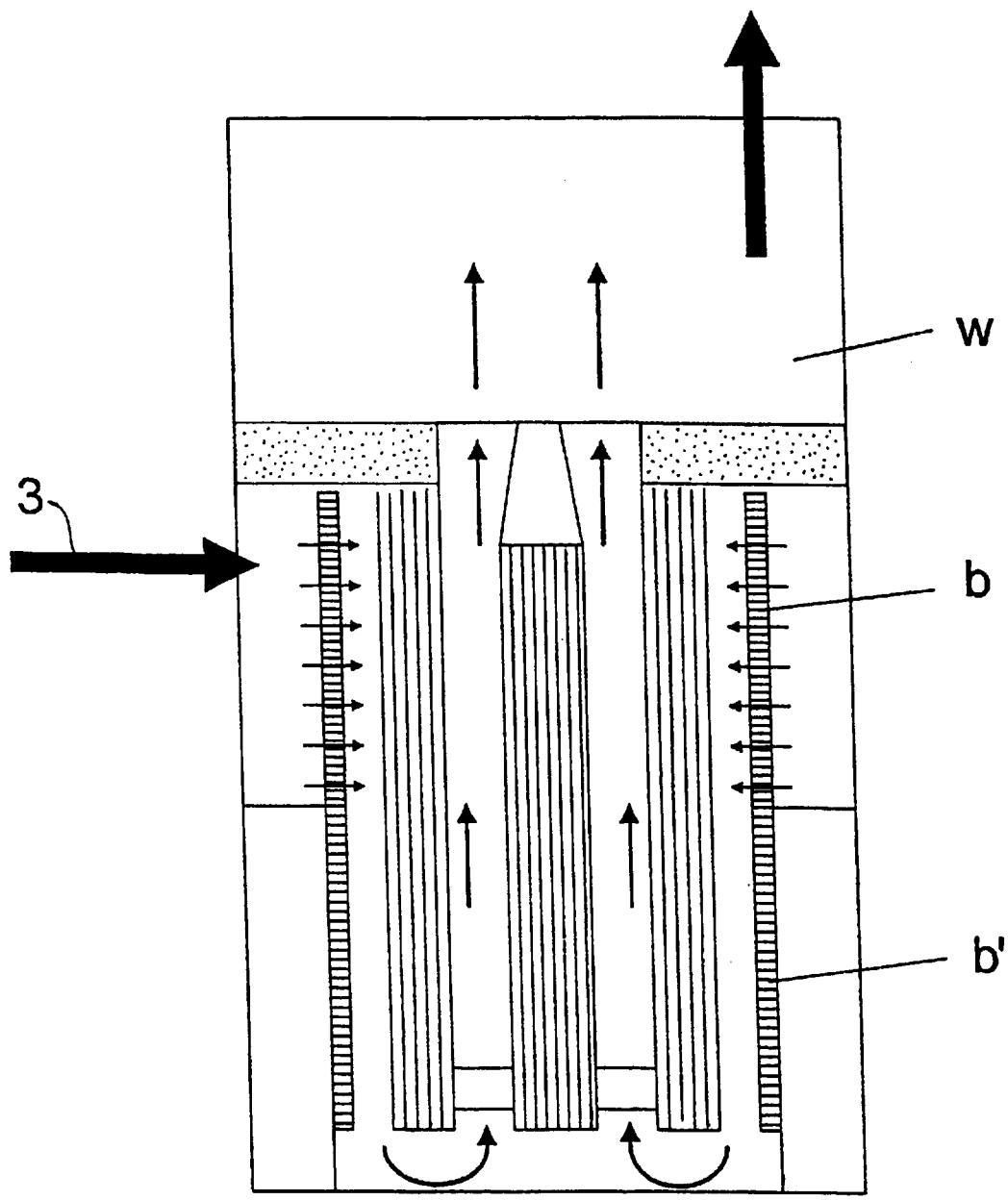
FIG. 4 shows the example shown in FIG. 2, in a partial-load operating mode.

In contrast to this, in the example shown in FIG. 4 the radiation burner b' is disconnected and is separated from the combustion gas supply line 3', so that only the radiation burner b is operated, and in this way the inventive device can operate in partial-load mode.

Figure 5:
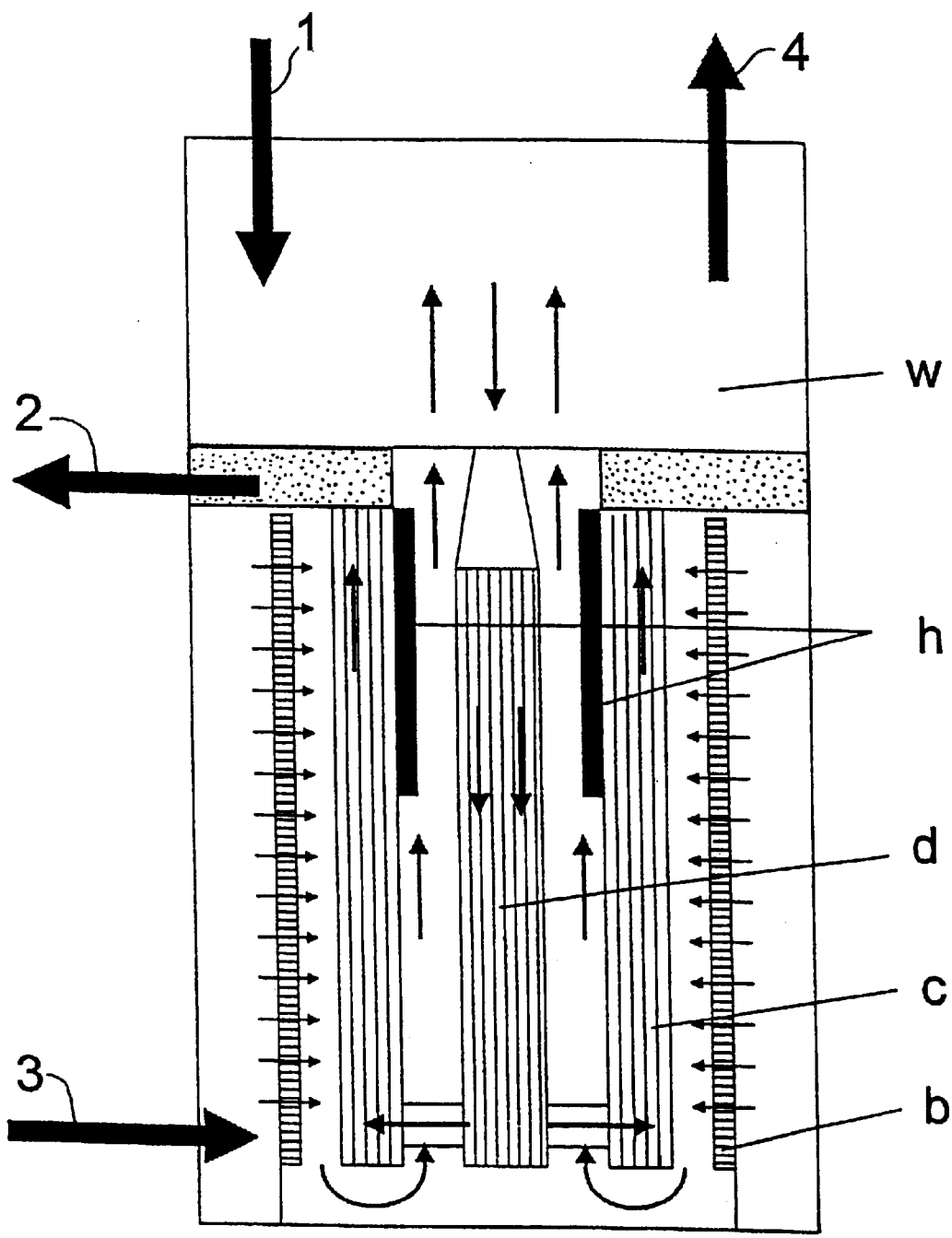
FIG. 5 shows the schematic design of a device having additional insulation.

FIG. 5 shows another example of an inventive device in which, again, only one radiation burner b is used. Here an insulator h is arranged in the gap between the annular-gap reactor c and the tube reactor d, through which the smoke gas is conducted into the heat exchanger w, in the area of the exit of the smoke gas to the heat exchanger w. In this way, the upper, inner jacket surface of the annular-gap reactor c is thermally insulated. This brings about a still higher final temperature of the reforming, and a lower radiation into the starting zone of the first part of the reforming reactor, i.e. in the tube reactor d, where experience has shown that a large part of the conversion takes place, and thus a higher reaction heat flow is required.

Due to the insulation h, the temperature in the entry region of the tube reactor d decreases, and the reaction conversion at this point decreases. In this way, the conversion in the reforming is correspondingly displaced into subsequent zones of the reactor that are maintained at higher temperatures. This has an advantageous effect in that the catalyst loading is made uniform overall, and thus the lifespan of the reforming reactor can be lengthened, and its degree of efficiency can be kept at a high level for a longer period of time.

Figure 6:
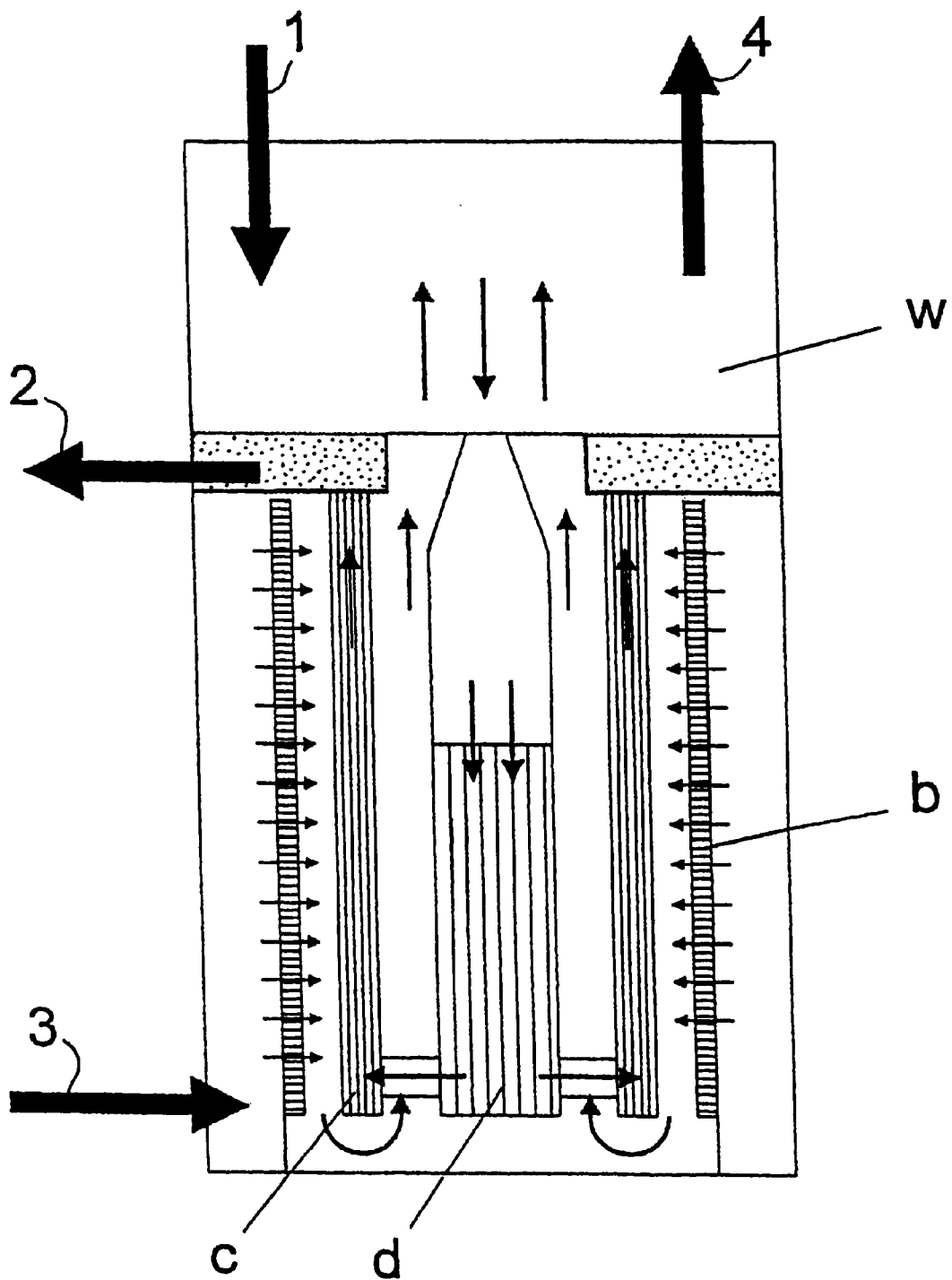
FIG. 6 shows the schematic design of a device having a special construction of the tube reactor.

FIG. 6 schematically shows another example, in which the upper part of the tube reactor d is fashioned as an empty tube, or no catalyst is located in the upper part. This reduces the effective height of this part of the reforming reactor in comparison with the annular-gap reactor c that forms the second part of the reforming reactor. In this way, no reaction takes place in this region, and only a small amount of heat is absorbed. The location having the greatest heat requirement, i.e. the entry into the first catalyst honeycomb of the tube reactor d, is spatially separated from the exit of the annular-gap reactor c to the synthesis gas carry-off 2, where temperatures that are as high as possible are supposed to ensure the complete conversion of the hydrocarbons into synthesis gas.

Figure 7:
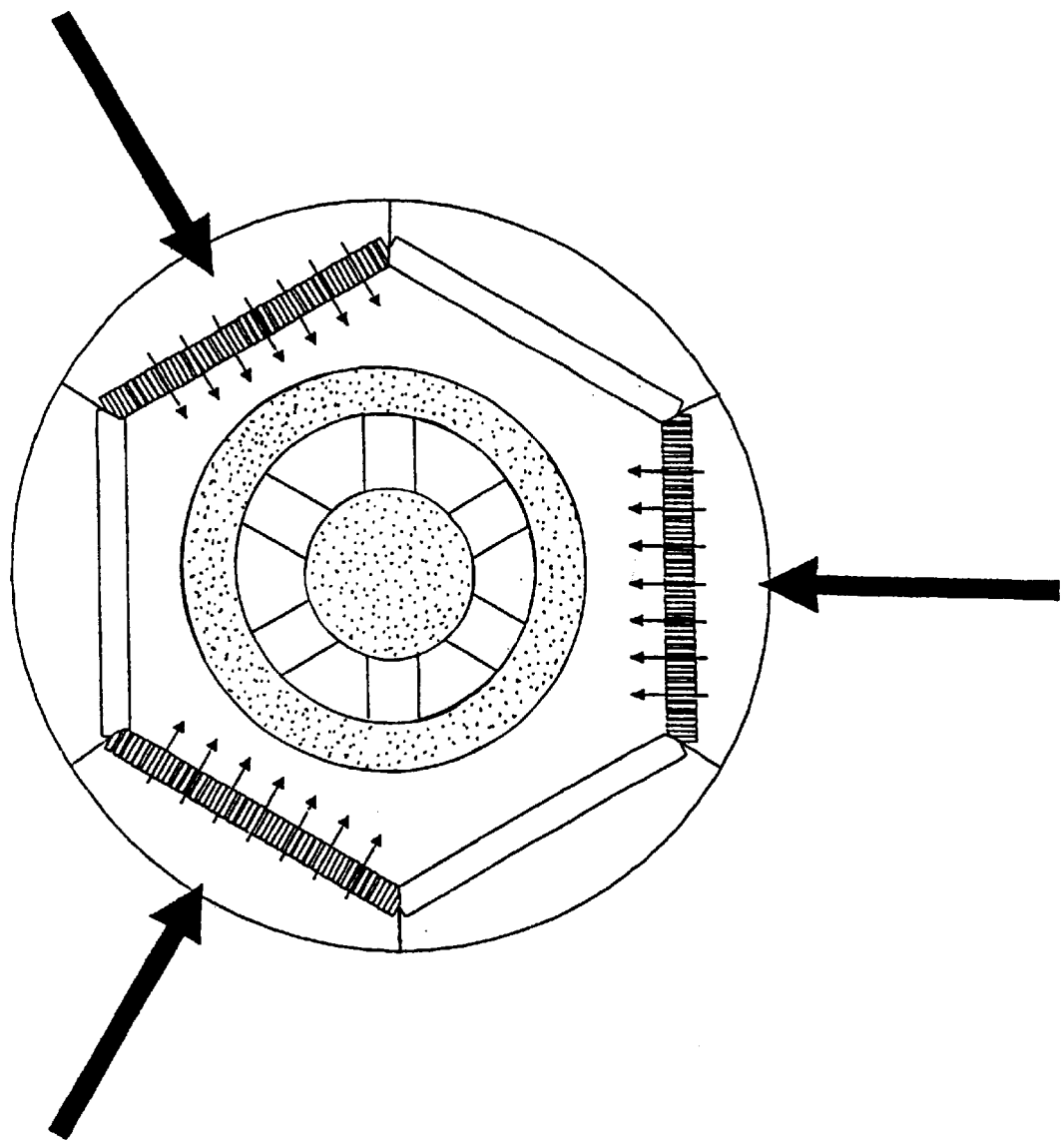
FIG. 7 shows the schematic design of a device according to FIG. 1, in another operating mode.

FIG. 7 shows another possibility for the operation of the radiation burner b in partial-load operation. Here only some individual plates of the radiation burner b are supplied with combustion gas, and other individual plates are disconnected. For a uniform production of heat, it is advantageous to change the connected or disconnected individual plates of the radiation burner b in alternating fashion.

What is claimed is:

1. A device for reforming educts containing hydrocarbons, having comprising a radiation burner and a reforming reactor into which the educt gas is introduced, wherein the reforming reactor is made up of a first part and a second part, the radiation burner surrounds the reforming reactor and heats the reforming reactor by radiation and convection, wherein the first part of the reforming reactor is fashioned as an annular-gap reactor surrounding the second part fashioned as a tube reactor and wherein smoke gas is conducted between the two reforming reactors parts in counter-current to the educt gas, and the reforming reactor contains, at least in part, metal honeycomb bodies having a catalyst coating.

2. The device according to claim 1, wherein a heat exchanger, is arranged above the reforming reactor.

3. The device according to claim 2, wherein the heat exchanger has a coiled tube for the introduction of educt around which there flows smoke gas that is conducted to a smoke gas exit through a plurality of concentric tubes that present a labyrinth structure.

4. The device according to claim 1, wherein the radiation burner is made of ceramic apertured plates.

5. The device according to claim 1, wherein a gas distributor tube is present that has an aperture structure distributed over a height defined by the radiation burner, through which a combustion gas is conducted from a combustion gas supply line to the radiation burner in uniform fashion.

6. The device according to claim 1, characterized in that the radiation burner is divided into several segments.

7. The device according to claim 1, characterized in that the radiation burner is constructed in segmented fashion from several individual plates.

8. The device according to claim 1, wherein at least two radiation burners are arranged one over the other.

9. The device according to claim 1, characterized in that an insulator is arranged in the upper region between the annular gap reactor and the tube reactor.

10. The device according to claim 1, characterized in that the entry region for the educt or educts of the tube reactor is fashioned as an empty tube, or has no catalyst coating.

* * * * *